United States Patent
Harada et al.

(10) Patent No.: US 8,233,056 B2
(45) Date of Patent: Jul. 31, 2012

(54) NETWORK IMAGE-SYNTHESIS DISPLAY SYSTEM

(75) Inventors: Masayuki Harada, Tokyo (JP); Hiroshi Yoshida, Tokyo (JP); Yasunori Tsubaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 520 days.

(21) Appl. No.: 12/514,271

(22) PCT Filed: Nov. 10, 2006

(86) PCT No.: PCT/JP2006/322457
§ 371 (c)(1), (2), (4) Date: Nov. 30, 2009

(87) PCT Pub. No.: WO2008/056421
PCT Pub. Date: May 15, 2008

(65) Prior Publication Data
US 2010/0110167 A1    May 6, 2010

(51) Int. Cl.
*H04N 5/235* (2006.01)
(52) U.S. Cl. .............. 348/222.1; 348/47; 348/211.1; 348/211.3
(58) Field of Classification Search .............. 348/47, 348/211.1, 211.3, 222.1
See application file for complete search history.

(56) References Cited

U.S. PATENT DOCUMENTS

| | | | |
|---|---|---|---|
| 6,424,752 B1 * | 7/2002 | Katayama et al. | 348/584 |
| 6,522,787 B1 * | 2/2003 | Kumar et al. | 348/E5.022 |
| 7,154,538 B1 * | 12/2006 | Fukasawa et al. | 348/211.3 |
| 2001/0019363 A1 | 9/2001 | Katta et al. | |
| 2003/0122949 A1 * | 7/2003 | Kanematsu et al. | 348/333.01 |
| 2009/0002637 A1 | 1/2009 | Harada | |

FOREIGN PATENT DOCUMENTS

| | | |
|---|---|---|
| EP | 1 134 718 A2 | 9/2001 |
| EP | 1 471 482 A1 | 10/2004 |
| EP | 1 471 483 A1 | 10/2004 |
| JP | 11-313304 A | 11/1999 |
| JP | 2000-259517 A | 9/2000 |
| JP | 2001-36898 A | 2/2001 |
| JP | 2001-320616 A | 11/2001 |
| JP | 2003-244683 A | 8/2003 |
| JP | 2004-159154 A | 6/2004 |
| JP | 2005-12619 A | 1/2005 |
| JP | 2005-333552 A | 12/2005 |
| WO | WO-2006/030501 A1 | 3/2006 |

* cited by examiner

*Primary Examiner* — Phuoc Nguyen
(74) *Attorney, Agent, or Firm* — Birch, Stewart, Kolasch & Birch, LLP

(57) ABSTRACT

Using a plurality of transmission units (110, 111, 112), multicast transmission of camera images shot by a plurality of cameras (101, 102, 103) is performed by way of a network, and then, a synthesis-parameter calculation unit (105) calculates, corresponding to image processing units each, synthesis-parameters required to synthesize using the camera images display images to be displayed on respective display units (113, 114, 115, 116), and transmits the synthesis-parameters to the image processing units (106, 107, 108, 109), whereby the image processing units (106, 107, 108, 109) synthesize display images from the camera images, based on the synthesis-parameters. Synthesis processing of the display images thereby is performed being distributed to the image processing units each.

5 Claims, 11 Drawing Sheets

FIG. 9

| ITEM | | | SPECIFIED CONTENTS | |
|---|---|---|---|---|
| | | | TRANSMISSION UNIT 110 | TRANSMISSION UNIT 111 |
| IMAGE-PROCESSING PARAMETER | IMAGE-SELECTION PARAMETER | REGION-RANGE PARAMETER | REGION-RANGE IN IMAGE 202 TO BE EXTRACTED | REGION-RANGE IN IMAGE 203 TO BE EXTRACTED |
| | IMAGE-TRANSFORM PARAMETER | | TRANSFORMATION MATRIX TO LET IMAGE 202 CORRESPOND TO DISPLAY REGION 702a | TRANSFORMATION MATRIX TO LET IMAGE 203 CORRESPOND TO DISPLAY REGION 702b |
| | IMAGE-QUALITY ADJUSTMENT PARAMETER | | IMAGE-QUALITY ADJUSTMENT PARAMETER FOR IMAGE 202 | IMAGE-QUALITY ADJUSTMENT PARAMETER FOR IMAGE 203 |

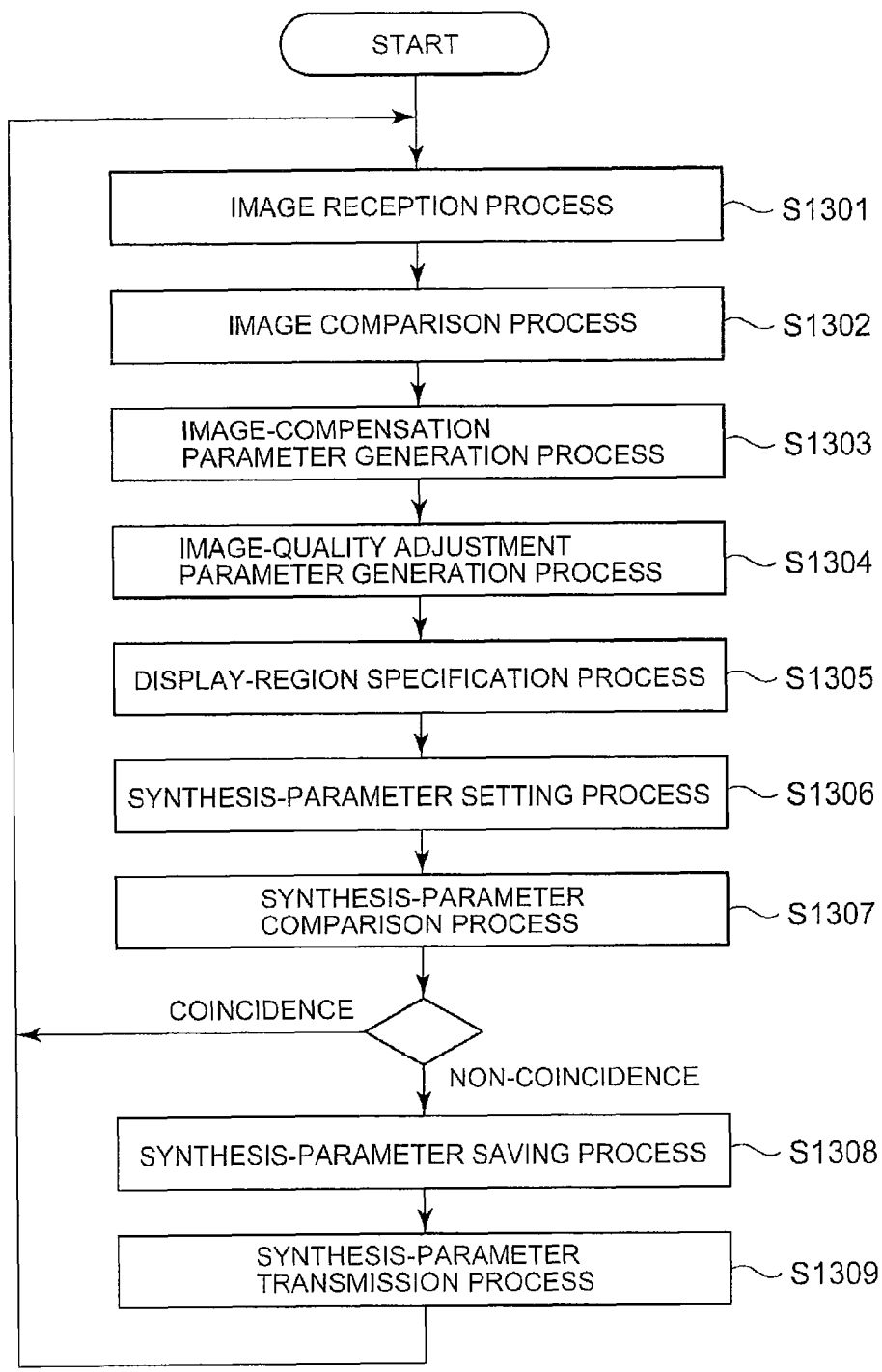

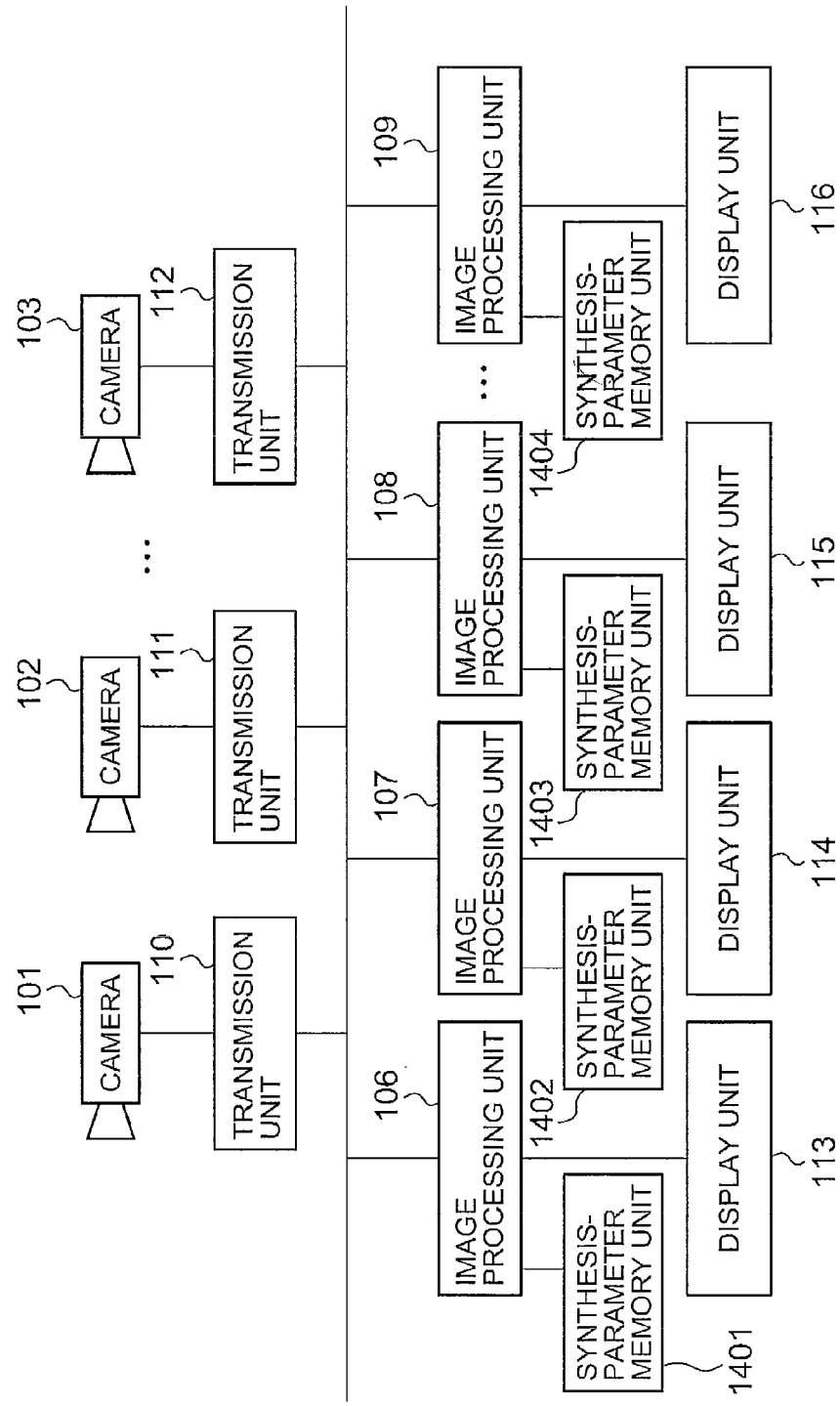

NETWORK IMAGE-SYNTHESIS DISPLAY SYSTEM

TECHNICAL FIELD

The present invention relates to a network image-synthesis display system for displaying images shot by a plurality of cameras connected to a network on a plurality of display units connected to the network.

BACKGROUND ART

As devices having a function to display an image shot by a remotely-placed camera, there are a large number of them starting with a television. In addition, with the development of a network such as the Internet in recent years, it is generally taking place that an image shot by a camera connected to the network is displayed on a personal computer. Meanwhile, a display system that displays an image in a range wider than the range one camera can shoot is also proposed by synthesizing images shot by a plurality of cameras (for example Patent Document 1). Moreover, in order to display a large image, a large-sized multiple screen device that combines images of a plurality of display processing units is also commercialized to display the combined ones as one large image.
[Patent Document 1] Japanese Patent Application Publication No. 2002-244683.

DISCLOSURE OF THE INVENTION

Problems to be Solved by the Invention

However, in a system in which one synthesis image is produced from images shot by a plurality of cameras, the synthesis image is transmitted to a remotely-placed display device by way of a network and the display device displays the received synthesis image, its image-synthesis processing becomes a bottleneck in the system operations because a load for the image-synthesis processing is increased according to an increase in the number of the cameras. Namely, there is a problem in which the number of camera images that can be processed at the same time is limited by processing capacity for the image synthesis.

In addition, since the amount of data of a synthesis image increases according to the increase in the number of the cameras, there is also a problem in which a network load increases at the time of network transmission of the synthesis image. Moreover, when the display device is constituted of a plurality of display units and one synthesis image is displayed by combining display images of the plurality of display units, each of the display units requires processing to segment and/or select a portion of the received synthesis image in accordance with the display's own region, so that there is also a problem in which a processing load of the display units each is also increased.

The present invention has been directed at solving those problems, and an object of the invention is to obtain a network image-synthesis display system that is able to eliminate the bottleneck in image-synthesis processing caused by the increase in the number of cameras, and also to reduce network's communication traffic in image transmission.

Means for Solving the Problems

A network image-synthesis display system according to the present invention comprises: using a plurality of transmission units, multicast transmission of camera images shot by a plurality of cameras is performed by way of a network, and then, a synthesis-parameter calculation unit calculates, corresponding to image processing units each, synthesis-parameters required to synthesize using the camera images display images to be displayed on respective display units, and transmits the synthesis-parameters to the image processing units each, whereby the image processing units synthesize display images from the camera images, based on the synthesis-parameters.

Effects of the Invention

According to the network image-synthesis display system in the present invention, image processing units each are so arranged that only a display image to be displayed on one display unit undergoes synthesis processing, so that, in comparison with a case in which images to be displayed on all of display units undergo synthesis processing by one image processing unit, there exist effects in which a processing load is not concentrated and a bottleneck does not occur in the synthesis processing. In addition, because it is not necessary to transmit a synthesis image over a network, there also exists an effect that a network load can be reduced.

BRIEF DESCRIPTION OF DRAWINGS

FIG. 9 is a diagram indicating specified contents of a synthesis-parameter;
FIG. 13 is a chart showing the operation flows of a synthesis-parameter calculation unit according to Embodiment 2 of the present invention;
and
FIG. 14 is a diagram illustrating a configuration of a network image-synthesis display system according to Embodiment 3 of the present invention.

EXPLANATION OF NUMERALS AND SYMBOLS

"101," "102," "103," designate cameras; "104," network; "105," synthesis-parameter calculation unit; "106," "107,"

"108," "109," image processing units; "110," "111," "112," transmission units; and "113," "114," "115," "116," display units.

BEST MODE FOR CARRYING OUT THE INVENTION

Embodiment 1

Figure 1:
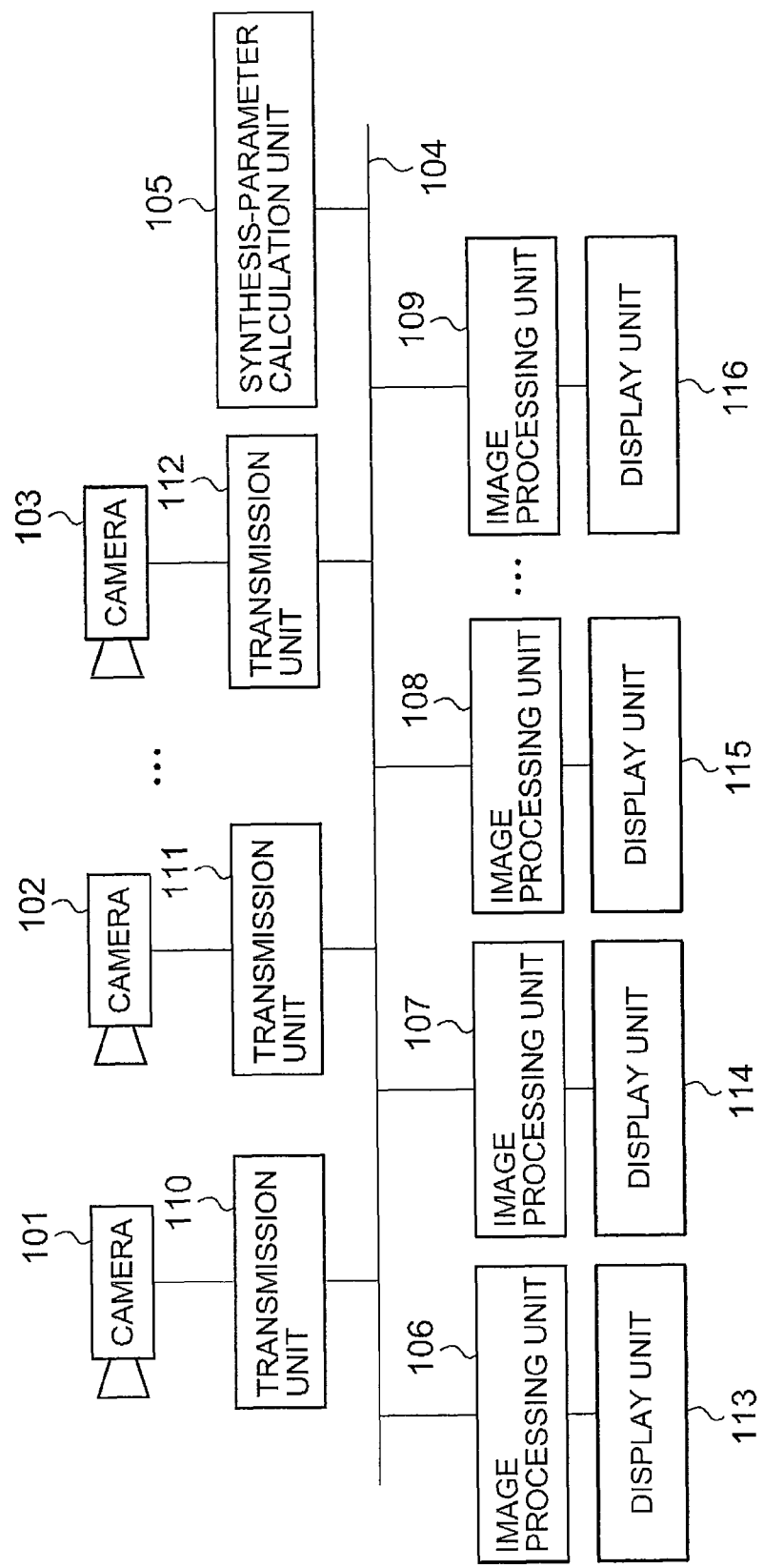
FIG. 1 is a diagram illustrating a configuration of a network image-synthesis display system according to Embodiment 1 of the present invention.

A configuration of a network image-synthesis display system according to Embodiment 1 of the present invention will be explained referring to FIG. 1. The network image-synthesis display system is constituted of: cameras 101, 102 and 103 each for shooting images; transmission units 110, 111 and 112 for performing multicast transmission of the images shot by these cameras to a synthesis-parameter calculation unit 105 and to image processing units 106, 107, 108 and 109 by way of a network 104; the synthesis-parameter calculation unit 105 for calculating synthesis-parameters to be used for synthesizing using a plurality of camera images, and for transmitting the calculated synthesis-parameters to the image processing units 106, 107, 108 and 109 by way of the network 104; the image processing units 106, 107, 108 and 109 for synthesizing display images based on camera images received from the transmission units 110, 111 and 112 and on the synthesis-parameters received from the synthesis-parameter calculation unit 105; and display units 113, 114, 115 and 116 for displaying the synthesized display images.

Note that, the network 104 is a network that supports multicast transmission, and may be of the Internet, a dedicated communications line, a LAN, or the like. In addition, the three cameras and the four display units are used in FIG. 1; however, the number of cameras and that of display units are not limited to these.

Figure 2:
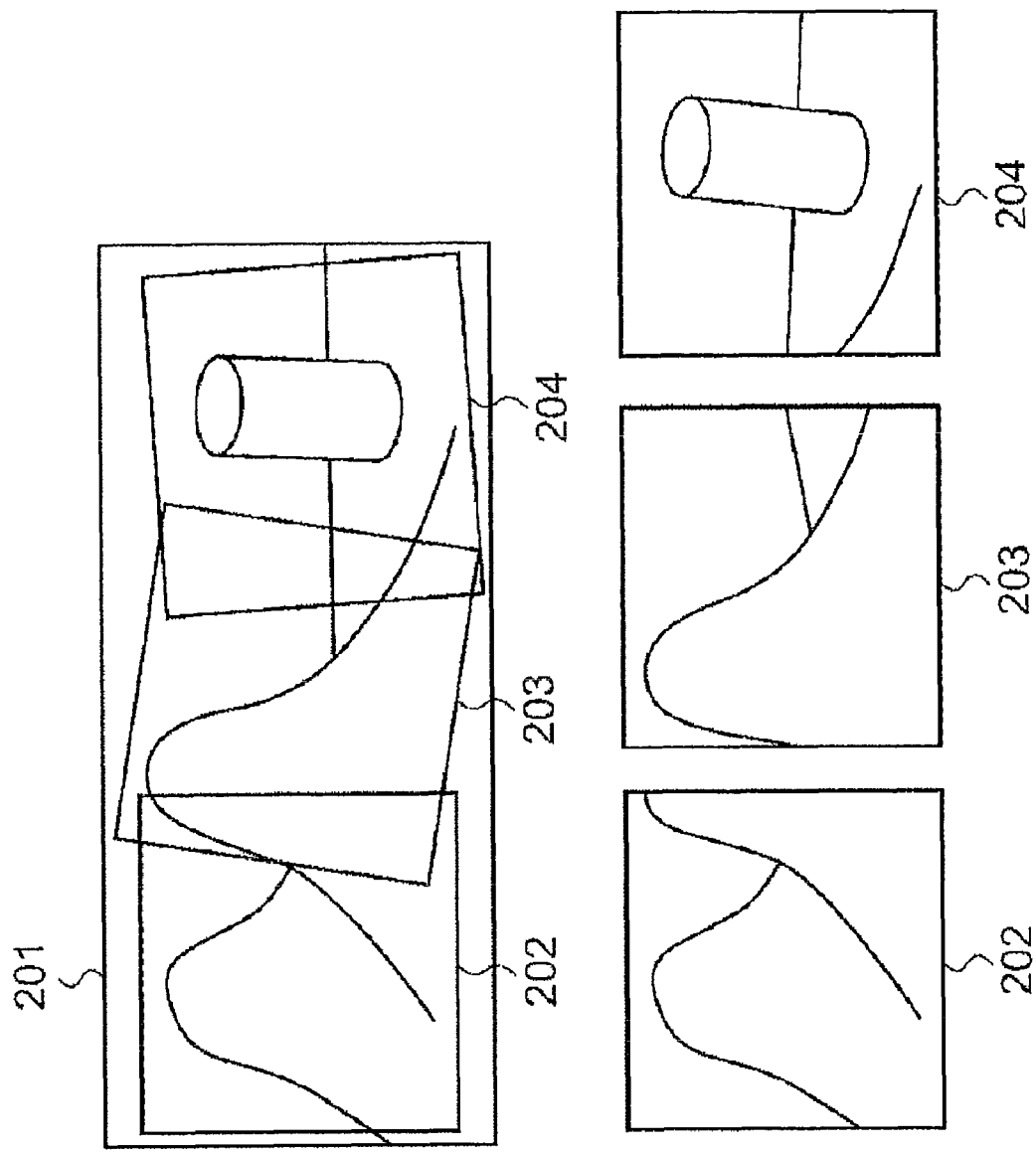
FIG. 2 is a diagram illustrating correlation between camera images shot by a plurality of cameras.

Next, the operations of the network image-synthesis display system in Embodiment 1 will be explained. FIG. 2 is an example illustrating the correlation between the images in which scenery 201 is shot by the three cameras 101, 102 and 103. In FIG. 2(a), an image shot by the camera 101 is a camera image 202, an image shot by the camera 102, a camera image 203, and an image shot by the camera 103, a camera image 204. As shown in FIG. 2(a), it is presumed that the camera images 202, 202 and 204 have partially overlapping image regions with other camera images, and that the scenery 201 is shot to be covered therewith as a whole. However, because it is difficult in placing cameras to precisely conform mutual position-attitudes between the cameras, each of the camera images has generally a different tilting and a scale as shown in the figure. Therefore, when the camera images 202, 203 and 204 are to be displayed on the display units 113, 114, 115 and 116, the boundary regions of each of the display images are not seamlessly adjoining if the camera images are simply displayed in juxtaposition shown in FIG. 2(b). Note that, in Embodiment 1 it is presumed that the cameras 101, 102 and 103 are fixedly placed, and their settings such as a camera angle are not varied throughout a shooting period.

The camera 101 outputs the camera image 202 into the transmission unit 110. Similarly, the camera 102 outputs the camera image 203 into the transmission unit 111, and the camera 103, the camera image 204 into the transmission unit 112.

The transmission unit 110 transforms the camera image 202 being shot by the camera 101 into a format compatible with network transmission, and performs multicast transmission of the transformed image to the synthesis-parameter calculation unit 105 and the image processing units 106, 107, 108 and 109 by way of the network 104. Similarly, the transmission units 111 and 112 each perform multicast transmission of the camera images 203 and 204 shot by the respective cameras 102 and 103 to the synthesis-parameter calculation unit 105 and the image processing units 106, 107, 108 and 109.

Figure 3:
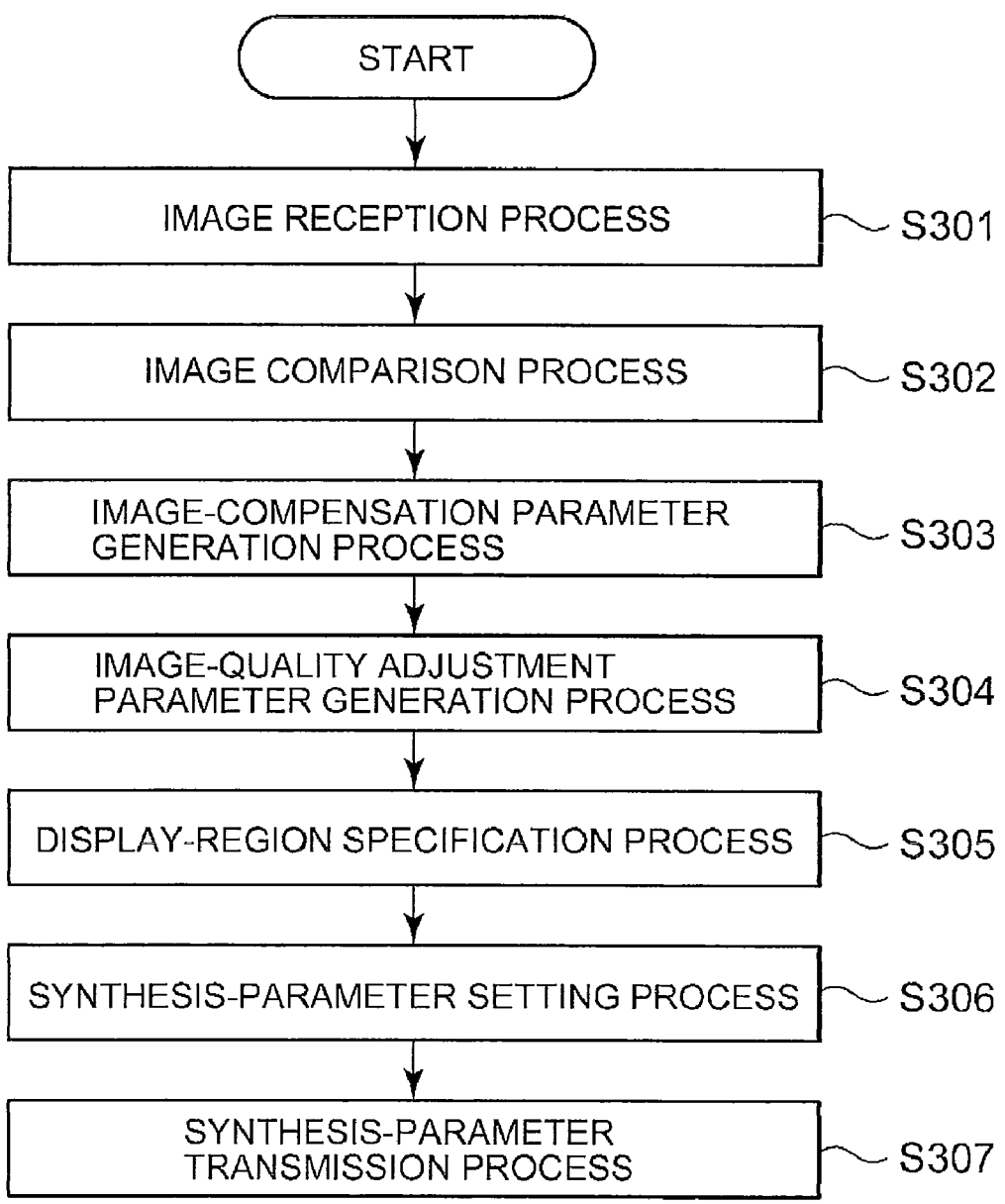
FIG. 3 is a chart showing the operation flows of a synthesis-parameter calculation unit according to Embodiment 1 of the present invention.

The synthesis-parameter calculation unit 105 calculates synthesis-parameters that is to be used by the image processing units 106, 107, 108 and 109 when they synthesize display images to be displayed on display units 113, 114, 115 and 116 using the camera images 202, 203 and 204, and transmits the calculated synthesis-parameters to the image processing units 106, 107, 108 and 109. Note that, each calculated synthesis-parameter corresponds to each of the image processing units, so that only a corresponding synthesis-parameter is transmitted to each of the image processing units. FIG. 3 is a chart showing the operation flows of the synthesis-parameter calculation unit 105. Hereinafter, the operations of the synthesis-parameter calculation unit 105 will be explained referring to the figures.

The synthesis-parameter calculation unit 105 first receives the camera images 202, 203 and 204 from the transmission units 110, 111 and 112 (image reception process: Step S301). Next, the received camera images 202, 203 and 204 are compared with each other, and common portions between each of the camera images are detected (image comparison process: Step S302). Here, a method of detecting the common portions between each of the camera images is not limited; however, as one of general techniques, there is a method in which feature points of each of the images are extracted, and the feature points are checked if they are commonly found in each of the images. As a specific technique, there is the SIFT (Scale Invariant Feature Transform).

Next, an image-compensation parameter for compensating the displacement between each of the images is derived so that common portions of the received camera images can be overlapped without causing displacement (image-compensation parameter generation process: Step S303).

Figure 4:
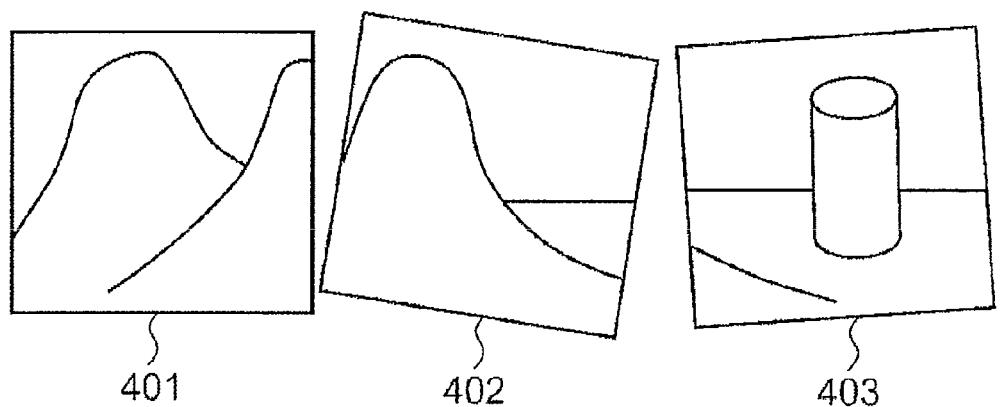
FIG. 4 is a diagram illustrating camera images of each of the cameras after having undergone an image compensation process.

Here, the roles of the image-compensation parameter will be explained. Because the camera images 202, 203 and 204 are shot by the cameras 101, 102 and 103 that are different with each other, a scale of an image, a tilting thereof, a camera's viewpoint or the like is different, so that displacement is produced if the camera images are to be overlapped without modification. For this reason, it is necessary to compensate the camera images 202, 203 and 204 so that common portions of each of the camera images are overlapped without displacement. FIG. 4 illustrates compensated images 401, 402 and 403 resulted in compensation from the camera images 202, 203 and 204, with their states of having the same tilting and the same dimensions for a common object over the respective compensated images. The image-compensation parameter is a parameter that specifies such an amount of image-compensation corresponding to each of the camera images.

Note that, while a specific format of the image-compensation parameter and a derivation technique thereof are not limited, it is generally known that, when a distant view, for example, is shot, a planar projective transformation (homography) can be derived as the compensation parameter, if common points of four or more can be detected between each of the images.

Figure 5:
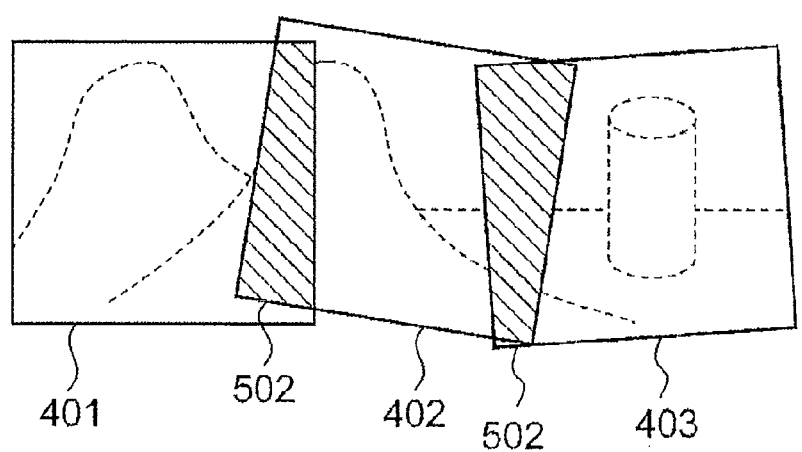
FIG. 5 is a diagram illustrating common image regions between each of the camera images.

Next, an image-quality adjustment parameter to adjust image-quality, such as luminance and color, is generated (image-quality adjustment parameter generation process: Step S304). FIG. 5 illustrates an appearance in which the compensated images shown in FIG. 4 are overlapped. In FIG. 5, the same items in FIG. 4 are designated by the same reference numerals. A common image region 501 indicates, when the compensated image 401 and the compensated image 402 are overlapped, an image region that is common to each other, and a common image region 502 indicates, when the compensated image 402 and the compensated image 403 are overlapped, an image region that is common to each other. When image synthesis proceeds, two compensated images in the common image regions 501 and 502 are added together, thereby their luminance differs from the single image region portions, so that it is necessary to adjust the luminance. In addition, when the images of the common image regions show different color therebetween clue to the difference in reflection of light and camera parameters, it is also necessary to adjust color components. The image-quality adjustment parameter specifies the amount of image-quality adjustment so that unevenness is not produced in the image quality between the images when the compensated images are overlapped with each other as described above. The image-quality adjustment parameter generation process is also called as color correction or blending, and there are various kinds of proposals as for the adjustment technique itself when the image synthesis is performed.

Next, image regions to be displayed by the display units 113, 114, 115 and 116 are specified (display-region specification process: Step S305). As shown in FIG. 5, a shape of the entirety region of a synthesis image which is composed of the compensated images 401, 402 and 403, is generally mismatched in its shape when Step S304 ends. Therefore, the shape is usually different from a shape of the entirety of display region which is a combined region of the display regions each for displaying the images on the display units 113, 114, 115 and 116. For this reason, it is necessary to specify image regions to be displayed by the display units in accordance with a shape of the entirety of their display regions.

Figure 6:
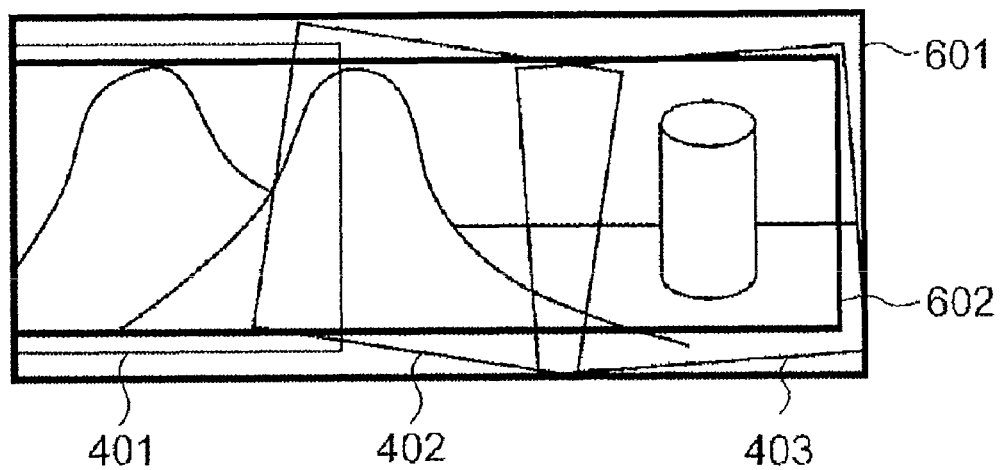
FIG. 6 is a diagram illustrating an example of specifying image regions.

In what follows, the explanation will be made with the presumption that an overall shape is rectangular when the display regions of the display units 113, 114, 115 and 116 are combined. In FIG. 6, two cases of an image region 601 and an image region 602 are illustrated as an example of specifying the image regions. Because the shape of the entirety of the display regions by the display units 113, 114, 115 and 116 is rectangular, the shapes of the image regions 601 and 602 each are also rectangular. With the image region 601, because there exist therein such regions that are not included in any images of the compensated images 401, 402 and 403, it is necessary to take such a process that fills in those regions with a predetermined color such as black. On the other hand, the image region 602 is an example in which the maximal rectangle is specified for the image region so that the image therein is included with either one of the compensated images 401, 402 and 403. In the following explanation, it is presumed that the image region 602 is specified as a display region.

Figure 7:
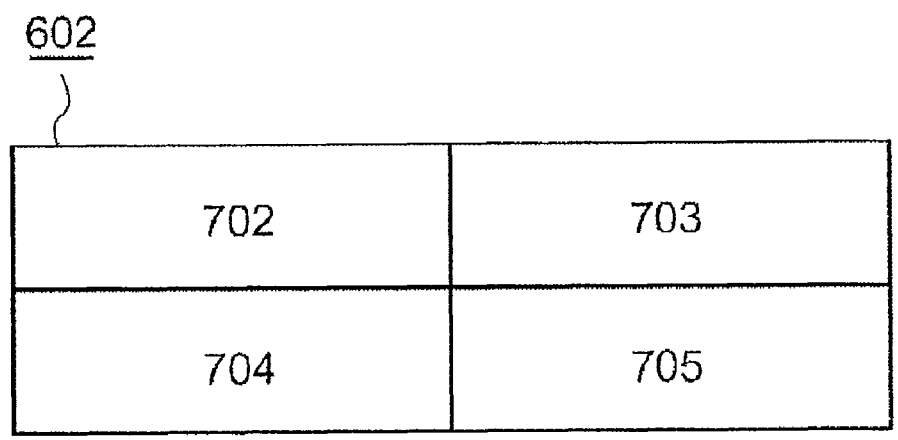
FIG. 7 is a diagram illustrating an example of segmenting an image region.

Next, synthesis-parameters to be transmitted to the image processing units 106, 107, 108 and 109 are set (synthesis-parameter setting process: Step S306). In Step S306, first, the image region 602 specified in the display-region specification process S305 is segmented in accordance with the shapes of the display regions each by the display units 113, 114, 115 and 116. Here, as illustrated in FIG. 7, the image region 602 is segmented into four congruent and rectangular regions that are defined as display regions 702, 703, 704 and 705 to be displayed on the display units 113, 114, 115 and 116, respectively.

Figure 8:
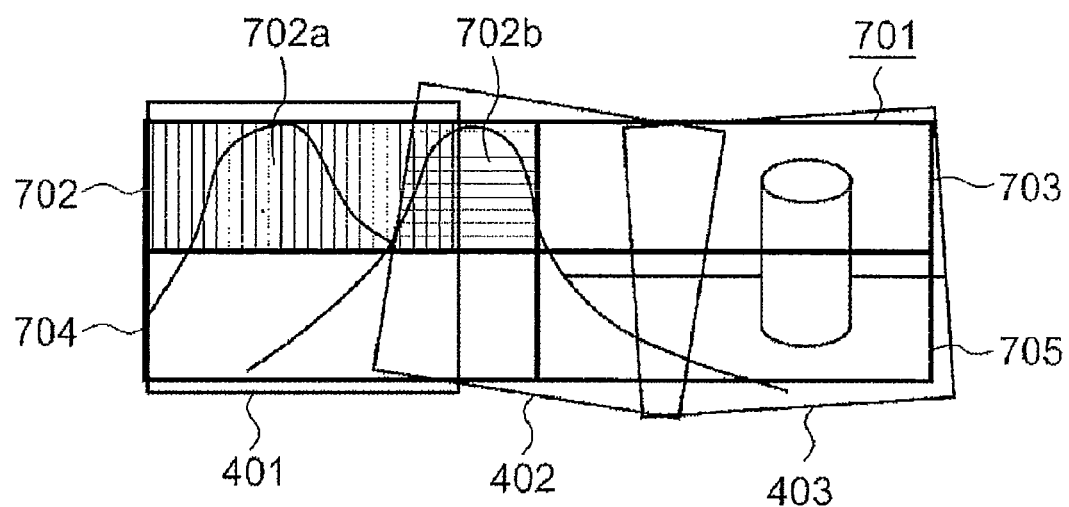
FIG. 8 is a diagram illustrating one example of correspondence relationships between display regions and the camera images.

Next, determined are correspondence relationships for synthesis between each of the display regions 702, 703, 704 and 705, and the compensated images 401, 402 and 403. FIG. 8 is a diagram illustrating one example of these correspondence relationships. In this example, it is presumed that, first, the image to be displayed on the display region 702 is synthesized from the compensated images 401 and 402; the image to be displayed on the display region 703, synthesized from the compensated images 402 and 403; the image to be displayed on the display region 704, synthesized from the compensated images 401 and 402; and the image to be displayed on the display region 705, synthesized from the compensated images 402 and 403. And then, determined are partial regions to be cut out from each of the compensated images so that each of the display regions can be synthesized as required. For example, as for use in the synthesis of the display region 702, two partial regions, i.e., a partial region 702a that is a common portion between the display region 702 and the compensated image 401, and a partial region 702b that is a common portion between the display region 702 and the compensated image 402, are specified as the partial regions that are to be extracted from the compensated images 401 and 402. Here, the partial regions 702a and 702b have the overlapping region with each other as illustrated in FIG. 8. In addition, calculated also are display positions of the partial regions 702a and 702b each in the display region 702.

Next, using the values each having been derived above, synthesis-parameters are set which are used when the image processing units 106, 107, 108 and 109 perform image-synthesis processing. Each of the synthesis-parameters is composed of an "image-selection parameter" that specifies transmission units to transmit camera-images to be taken for processing and an "image processing parameter" that specifies contents of the image-synthesis processing when a display image is synthesized from the received camera-images. In addition, the "image processing parameter" is composed of a "region-range parameter" that specifies partial regions to be used by the image-synthesis processing among the received camera images, an "image-transformation parameter" that can be expressed by a transformation matrix for mapping the points in the camera-images to the corresponding points in a display region, and an "image-quality adjustment parameter" that compensates luminance, chromaticity and the like. Here, the transformation matrix can be calculated from; the image-compensation parameter that is the amount of compensation for a scale and/or a tilting of the image generated in the image-compensation parameter generation process S303; and correspondence relationships between each of the partial regions and display regions specified by the "region-range parameter."

As one example, FIG. 9 indicates such a synthesis-parameter that the image processing unit 106 applies. The image processing unit 106 synthesizes a display image to be displayed on the display unit 113 using the camera image 202 received from the transmission unit 110 and the camera image 203 received from the transmission unit 111, so that an "image-selection parameter" of the synthesis-parameter is set as for the transmission unit 110 and the transmission unit 111, and an "image processing parameter" is set for each of the transmission units 110 and 111. Note that a "region-range parameter," an "image-transformation parameter" and an "image-quality adjustment parameter" are included in the "image processing parameter."

Lastly, the synthesis-parameters being set are transmitted to each of the image processing units (synthesis-parameter transmission process: Step S306). Namely, the synthesis-parameter for the image processing unit 106 is transmitted to the image processing unit 106. Similarly, synthesis-parameters for the image processing units 107, 108 and 109 are transmitted to the image processing units 107, 108 and 109, respectively. According to the above, the synthesis-parameters are generated for the image processing units each, and are individually transmitted to each of the image processing units.

Note that, it is possible to carry out at one time of the system startup, calculation of synthesis-parameters and transmission to each of the image processing units by the synthesis-parameter calculation unit 105 as an initial setting process.

Figure 10:
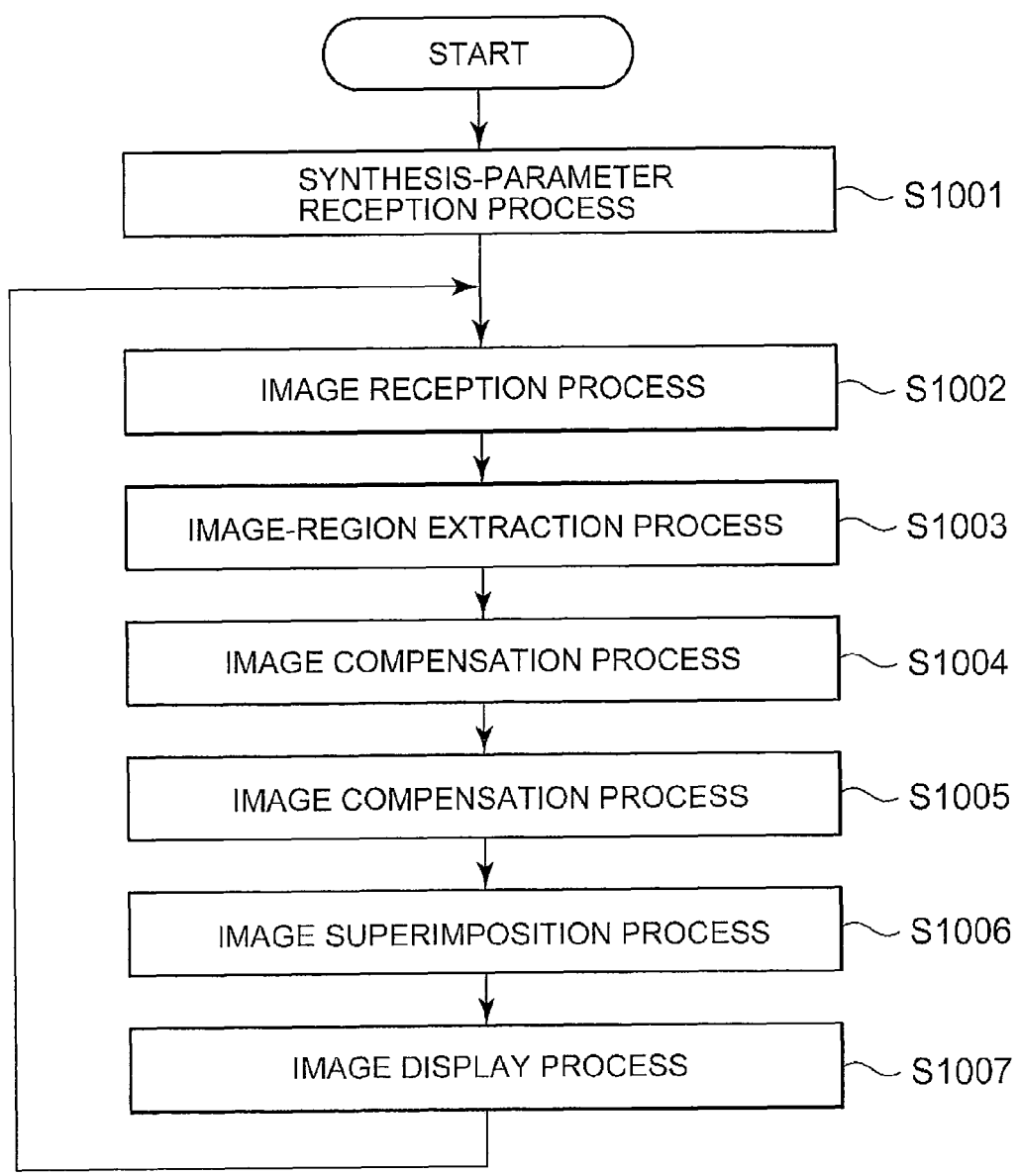
FIG. 10 is a chart showing the operation flows of an image processing unit.
Figure 11A:
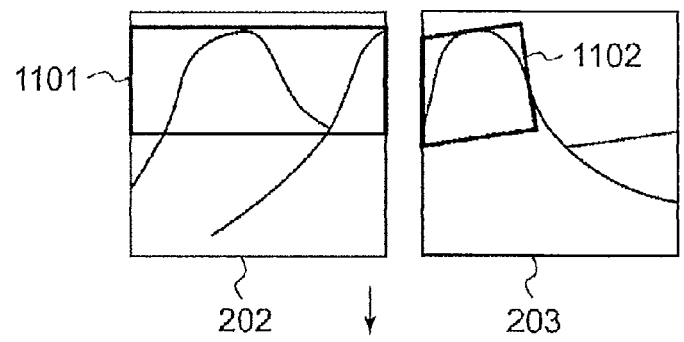
FIG. 11 is a diagram illustrating a method of synthesizing images in the image processing unit.
Figure 11B:
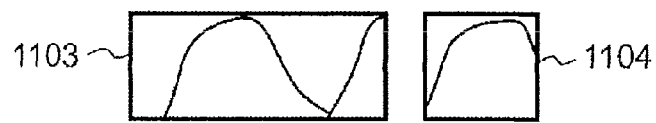
Figure 11C:
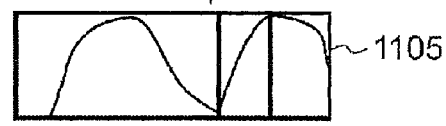
Figure 11D:
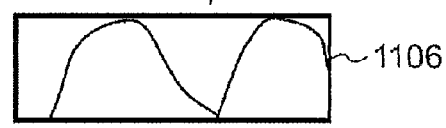

Next, the operations of the image processing units 106, 107, 108 and 109 will be explained. FIG. 10 is a chart showing the operation flows of the image processing units each. Hereinafter, the operations of the image processing units will be explained referring to the chart. Note that, the image processing units 106, 107, 108 and 109 each operate in similar operation procedures, so that the explanation will be made here for the image processing unit 106 as an example.

The image processing unit 106 receives a synthesis-parameter to be used for the image processing unit 106 transmitted from the synthesis-parameter calculation unit 105 (synthesis-parameter reception process: Step S1001). The received synthesis-parameter is used for the following image-synthesis processing. Here, it is presumed that the synthesis-parameter indicated in FIG. 9 is received as the synthesis-parameter for the image processing unit 106.

Next received are camera images transmitted from the transmission units specified by the "image-selection parameter" of the synthesis-parameter (image reception process: Step S1002). The image processing unit 106 receives, according to the synthesis-parameter in FIG. 9, the camera image 202 that the transmission unit 110 has transmitted, and the camera image 203 that the transmission unit 111 has transmitted.

Next, based on a region specification parameter of the "region-range parameter" included in the "image processing parameter" of the synthesis-parameter, image portions used for the image-synthesis processing are extracted from the received camera images (image-region extraction process: Step S1003). Using the synthesis-parameter in FIG. 9, the image processing unit 106 extracts respective partial regions from the camera image 202 received from the transmission unit 110, and from the camera image 203 received from the transmission unit 111. FIG. 11 is a diagram for explaining the processes after having undergone Step S1003 in the image processing unit 106. FIG. 11(*a*) shows a partial region 1101 extracted from the camera image 202, and a partial region 1102, from the camera image 203.

Next, using the "image-transformation parameter" included in the "image processing parameter" of the synthesis-parameter, the extracted partial regions 1101 and 1102 are transformed into compensated partial regions 1103 and 1104 (FIG. 11(*b*)) that are of the shapes corresponding to the display region 702 (image compensation process: Step S1004).

Next, the compensated partial regions 1103 and 1104 are subjected to image-quality adjustment using the "image-quality adjustment parameter" included in the "image processing parameter" of the synthesis-parameter, and are then superimposed with each other to produce a superimposed image 1105 (FIG. 11(*c*)) (image superimposition process: Step S1005).

Next, the superimposed image 1105 is outputted as one display image 1106 (FIG. 11(*d*)) into the display unit 113 (image display process: Step S1006).

From then on, by repeating the processes in Steps S1002 through S1007, it is possible to continuously synthesize the display image to be displayed on the display unit 113 using the camera images received from the transmission units 110 and 111.

In a similar manner to the image processing unit 106, the images transmitted from each of the cameras are processed in real time by operating the respective image processing units 107, 108 and 109 in parallel, and display images are synthesized to be displayed on each of the display units 114, 115 and 116.

Figure 12:
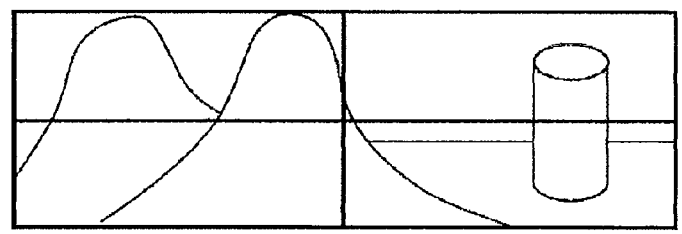
FIG. 12 is a diagram illustrating all of the images displayed on display units after having undergone the synthesis therefor.

The display units 113, 114, 115 and 116 display the respective display images outputted from the image processing units 106, 107, 108 and 109. According to the above, when the display units 113, 114, 115 and 116 are placed in juxtaposition as illustrated in FIG. 12, one screenful of images which are integrated with each other, can be displayed as a whole.

Note that, in the above explanation, the "image-transformation parameter" of the synthesis-parameter is specified as a transformation matrix for transforming camera images into display images; however, the "image-transformation parameter" may be defined as an inverse matrix of this transformation matrix. In this case, a partial region for a display region of the display units each is to be specified as for a "region-range parameter." For example, in a case of the image processing unit 106, the display region 702*a* may be specified as for the "region-range parameter."

In addition, it may be so configured that an image-compression encoding process is provided in the transmission units 110, 111 and 112 each so that camera images are transmitted in a compressed state with a reduced amount of data, and at the same time, a compressed-image decoding process is provided in the synthesis-parameter calculation unit 105 and the image processing units 106, 107, 108 and 109 each so that the camera images are restored by decoding the compressed images received from the transmission units. According to the configuration described above, a network load in the camera-image transmission can be further reduced.

Moreover, instead of individually transmitting synthesis-parameters for each of the image processing units to the respective image processing units, it may be adopted that multicast transmission of the synthesis-parameters for every image processing units is performed at one time to all of the image processing units, and each of the image processing units uses by selecting only a parameter to be used for its own image-synthesis processing out of the received synthesis-parameters.

In the network image-synthesis display system according to Embodiment 1 as described above, each of the image processing units undergoes synthesis processing of an image only to be displayed on one display unit, so that, in comparison with a case in which one image processing unit performs synthesis processing of the display images for all of the display units, such an effect can be achieved that a processing load is not concentrated and a bottleneck does not occur against the synthesis processing. In addition, because it is not necessary to transmit a synthesized image over a network, there also exists an effect that a network load can be reduced.

Embodiment 2

In Embodiment 1, the synthesis-parameter calculation unit 105 operates to calculate synthesis-parameters only once as an initialization process of the network image-synthesis display system, and the image processing units 106, 107, 108 and 109 operate to apply the synthesis-parameters to the image-synthesis processing at all the time-periods during the system operations. For this reason, when there is a change in settings such as a change in disposed position of each camera and/or shooting subject thereof at a time during the system operations, a displacement may occur in the display by the display units 113, 114, 115 and 116 after the change in the settings if the synthesis-parameters calculated before the change in the settings are continuously used. On the other hand, a network image-synthesis display system in Embodiment 2 is so configured that, even when a change in the disposed position of each camera occurs during the system operations, displaying normally a synthesis image can be carried out. The arrangement of units each constituting the system of Embodiment 2 is similar to that in the system configuration in Embodiment 1 shown in FIG. 1. Thus, focusing on the different points to Embodiment 1, the operations of Embodiment 2 will be explained below.

In Embodiment 2, it is presumed that a change in settings of the cameras 101, 102 and 103 is allowed during image shooting. For example, a change in disposed position of each camera and/or shooting subject thereof may be come up with. The transmission units 110, 111 and 112 perform multicast transmission of camera images being shot to the synthesis-parameter 105 and the image processing units 106, 107, 108 and 109 in a similar manner to the case in Embodiment 1.

Next, the operations of the synthesis-parameter calculation unit 105 will be explained referring to the operation-flow chart in FIG. 13. The processes (Steps S1301 through S1307) to be performed from receiving camera images until setting synthesis-parameters in the synthesis-parameter calculation unit 105 are the same as the processes in Embodiment 1 (Steps S301 through S306 in FIG. 3); thus, their explanation is omitted.

Next, each of the calculated synthesis-parameters is compared with the immediately preceding calculated synthesis-parameter already saved in a memory medium (not shown in the figure) inside the synthesis-parameter calculation unit 105 (synthesis-parameter comparison process: Step S1307). Note that, when synthesis-parameters are calculated for the first time after a system startup, there exists no immediately preceding synthesis-parameter, so that the following processes are carried out without performing the comparison with the presumption that a comparison result is "Coincidence."

When a result of the synthesis-parameter comparison process is "Non-Coincidence," there exists a change in the settings in either of the camera 101, 102 or 103, so that the calculated synthesis-parameters are saved into a memory medium inside the synthesis-parameter calculation unit 105 (synthesis-parameter saving process: Step S1308). Subsequently, the calculated synthesis-parameters are transmitted to each of the image processing units 106, 107, 108 and 109 (synthesis-parameter saving process: Step S1309). After completing the synthesis-parameter transmission, the process returns again to the image reception process S1301.

On the other hand, when a result of the synthesis-parameter comparison process is "Coincidence," there exists no change in the settings in any of the cameras 101, 102 and 103, so that the process returns to the image reception process S1301 without saving the synthesis-parameters and without transmitting them to each of the image processing units.

From then on, Steps S1301 through S1309 are repeatedly executed. Note that, a repetition period of the processing may be preset in accordance with the frequency of a change in camera settings. For example, it is possible to repeatedly process in a constant period such as in every five minutes. It is also possible to repeatedly process not in the constant period, but in accordance with a predetermined time-schedule.

Although the image processing units 106, 107, 108 and 109 perform synthesis processing of the display images based on synthesis-parameters received from the synthesis-parameter calculation unit 105, they are operated so as to perform the synthesis processing using lately received synthesis-process parameters whenever the synthesis-process parameters are lately received after having the synthesis processing started. According to the configuration described above, even when the synthesis-parameters are modified, it is possible to change a method of synthesizing display images in accordance with the parameter modification. Because of these, the display images of the display units 113, 114, 115 and 116 are also changed over in accordance with the modification of the synthesis-parameters.

As described above, the network image-synthesis display system according to Embodiment 2 is so configured that the synthesis-parameter calculation unit 105 repeatedly recalculates synthesis-parameters, the calculated synthesis-parameters are compared with saved synthesis-parameters, and when the calculated synthesis-parameters differ from the immediately preceding synthesis-parameters having been transmitted to the image processing units, the latest synthesis-parameters are transmitted to the image processing units with the presumption that a modification of the synthesis-parameters is detected, so that there exists an effect that a synthesis image having no displacement can be quickly displayed even when there is a change in settings such as a change in a setting position of the cameras.

Embodiment 3

In Embodiments 1 and 2, the synthesis-parameter calculation unit is configured to calculate synthesis-parameters at the time of system operations, and to transmit the synthesis-parameters to each of the information processing units. On the other hand, a network image-synthesis display system in Embodiment 3 is so configured without using a synthesis-parameter calculation unit that a synthesis-parameter calculated by another means can be used and individually set for information processing units each, and that each of the information processing units thus performs image synthesis using such a synthesis-parameter.

FIG. 14 is a diagram illustrating a system configuration of the network image-synthesis display system in Embodiment 3. Note that, in FIG. 14, the same reference numerals and symbols designate the same items as, or the items corresponding to, those shown in FIG. 1. Hereinafter, focusing on the different points to Embodiment 1, the operations will be explained.

First, synthesis-parameters used in each of the image processing units 106, 107, 108 and 109 are preliminarily calculated by some means before the system startup. As a method to calculate the synthesis-parameters, it may be adopted that, for example, a planar projective transformation is derived from setting values (a scale, a tilting, and the like) of the cameras 101, 102 and 103, and from information on disposed positional relationships among the cameras, and then the synthesis-parameters for the image processing units each are calculated using this transformation.

The synthesis-parameters thus preliminarily prepared are set into synthesis-parameter memory units 1401, 1402, 1403 and 1404 that are attached to the image processing units 106, 107, 108 and 109, respectively. Here, the synthesis-parameters to be set into each of the synthesis-parameter memory units are dedicated parameters used in each of the image processing units.

As a specific setting method into the synthesis-parameter memory units 1401, 1402, 1403 and 1404, a synthesis-parameter file including, for example, the written synthesis-parameters may be once read out and loaded into the image processing units 106, 107, 108 and 109, from a memory medium that has recorded the synthesis-parameter file, and the synthesis-parameter file thus read out and loaded is stored into the synthesis-parameter memory units 1401, 1402, 1403 and 1404, respectively.

After setting the synthesis-parameters, the image processing units 106, 107, 108 and 109 each synthesize, based on the synthesis-parameters having been set in the synthesis-parameter memory units 1401, 1402, 1403 and 1404, display images from the camera images received from the transmission units 110, 111 and 112. Specific processing procedures for the synthesis can be carried out in a similar manner to the case in Embodiment 1.

As described above, in the case where, without using a synthesis-parameter calculation unit, synthesis-parameters are calculated by another means and are stored into the synthesis-parameter memory units each attached to the image processing units, the image processing units can be operated without depending on a technique how to set the synthesis-parameters by the synthesis-parameter calculation unit, and therefore the scheme for executing the image-synthesis processing can be diversified. In addition, because the image synthesis can be performed exactly according to preset synthesis-parameters, there exists an effect that the image displaying can be realized in a more intended manner.

Note that, it may be adopted that synthesis-parameters to be preset into image processing units each are such synthesis-parameters that are set using a plurality of patterns, which are then used as the synthesis-parameters so that those patterns are changed over in accordance with a preset schedule. Because of these, it is possible to realize such an image-synthesis processing that is capable of diversifying more in image-expressions.

INDUSTRIAL APPLICABILITY

The present invention is applicable to systems such as a remote-image monitoring or live-image display system that combines images shot by a plurality of cameras connected to a network, and displays the combined ones as one image.

What is claimed is:

1. A network image-synthesis display system, comprising:
a plurality of cameras;
a plurality of transmission units provided corresponding to the cameras, for performing by way of a network, multicast transmission of camera images being shot by the cameras;
a plurality of image processing units for receiving the camera images, and for synthesizing their respective display images from the camera images;
a plurality of display units provided corresponding to the image processing units, for displaying said display images; and
a synthesis-parameter calculation unit for calculating, corresponding to each of the image processing units, a synthesis-parameter composed of an image-selection parameter designating a combination among the camera images from the plurality of transmission units and an image processing parameter specifying contents of image-synthesis processing, and for transmitting by way of the network the synthesis-parameter to the image processing units; wherein
the image processing units each perform, based on the image-processing parameter, the synthesis processing of camera images, among those from the transmission units, designated by the image-selection parameter, to produce said display images, whereby the synthesis processing of said display images is performed being distributed to the plurality of image processing units.

2. The network image-synthesis display system as set forth in claim 1, wherein the synthesis-parameter calculation unit repeatedly calculates said synthesis-parameter, and the image processing units save therein the synthesis-parameter that have been transmitted to the image processing units, and compare upon calculation, synthesis-parameter with the saved synthesis-parameter, to transmit the calculated synthesis-parameter to the image processing units when the calculated synthesis-parameter differs from the immediately preceding synthesis-parameter transmitted to the image processing units.

3. The network image-synthesis display system as set forth in claim 1 or claim 2, wherein the synthesis-parameter calculation unit transmits, to each of the image processing units, corresponding one of synthesis-parameters for the image processing units.

4. The network image-synthesis display system as set forth in claim 1 or claim 2, wherein
the synthesis-parameter calculation unit performs multicast transmission at one time to all of the image processing units, of the synthesis-parameters for the image processing units, and
each of the image processing units selects only a parameter to be used for its own image-synthesis processing out of said synthesis-parameters, and then performs synthesizing display images.

5. A network image-synthesis display system, comprising:
a plurality of cameras;
a plurality of transmission units provided corresponding to the cameras, for performing by way of a network, multicast transmission of camera images being shot by the cameras;
a plurality of image processing units for receiving the camera images, and for synthesizing their respective display images from the camera images; and
a plurality of display units provided corresponding to the image processing units, for displaying said display images; wherein
the image processing units each include a synthesis-parameter memory unit that stores a synthesis parameter composed of an image-selection parameter designating a combination among the camera images from the plurality of transmission units and an image processing parameter specifying contents of image-synthesis processing; and
display images are produced by synthesizing, based on the image-processing parameter, camera images, among those from the transmission units, designated by the image-selection parameter stored in the synthesis-parameter memory unit, whereby the synthesis processing of said display images is performed being distributed to the plurality of image processing units.

* * * * *